US008521474B2

(12) United States Patent
Kayani

(10) Patent No.: US 8,521,474 B2
(45) Date of Patent: Aug. 27, 2013

(54) INTELLIGENT SYSTEM DIAGNOSTICS FOR BANK NOTE PROCESSING MACHINES

(75) Inventor: Sohail Kayani, Irving, TX (US)

(73) Assignee: Toshiba International Corporation, Houston, TX (US)

( * ) Notice: Subject to any disclaimer, the term of this patent is extended or adjusted under 35 U.S.C. 154(b) by 419 days.

(21) Appl. No.: 12/557,370

(22) Filed: Sep. 10, 2009

(65) Prior Publication Data

US 2010/0063776 A1 Mar. 11, 2010

Related U.S. Application Data

(60) Provisional application No. 61/096,230, filed on Sep. 11, 2008.

(51) Int. Cl.

| | |
|---|---|
| ***G06F 3/01*** | (2006.01) |
| ***G06F 5/00*** | (2006.01) |
| ***G06F 5/08*** | (2006.01) |
| ***G06F 5/12*** | (2006.01) |

(52) U.S. Cl.

USPC ............ 702/184; 702/179; 702/182; 702/183

(58) Field of Classification Search

USPC ............ 702/19, 56, 130, 179, 182, 183, 184; 73/861.25; 705/3; 714/26

See application file for complete search history.

(56) References Cited

U.S. PATENT DOCUMENTS

| | | | | |
|---|---|---|---|---|
| 7,673,525 | B2 * | 3/2010 | Huang | 73/861.25 |
| 7,882,394 | B2 * | 2/2011 | Hosek et al. | 714/26 |
| 7,953,613 | B2 * | 5/2011 | Gizewski | 705/3 |
| 2002/0066125 | A1 | 5/2002 | Mukai | |
| 2004/0255354 | A1 | 12/2004 | Graef et al. | |

FOREIGN PATENT DOCUMENTS

| | | |
|---|---|---|
| EP | 1 324 285 | 2/2003 |
| KR | 10-2006-0108399 | 10/2006 |

OTHER PUBLICATIONS

PCT/US2009/056699, international filing date Sep. 11, 2009; See, PCT International Search Report mailed on Apr. 28, 2010 (from parent U.S. Appl. No. 61/096,212, filed Sep. 11, 2008, and U.S. Appl. No. 12/556,328, filed Sep. 9, 2009).

* cited by examiner

*Primary Examiner* — Marc Armand
*Assistant Examiner* — Felix Suarez
(74) *Attorney, Agent, or Firm* — Baker Botts L.L.P.

(57) ABSTRACT

A diagnostic system for use in a bank note processing machine, and a method of use. The system includes a plurality of operating condition sensors positioned to monitor areas of interest within the machine. A CPU automatically reads the sensors to obtain an initial baseline reading against which operating data is compared. Decisions are made based upon this comparison.

18 Claims, 2 Drawing Sheets

INTELLIGENT SYSTEM DIAGNOSTICS FOR BANK NOTE PROCESSING MACHINES

CROSS-REFERENCE TO RELATED APPLICATIONS

Figure 1:
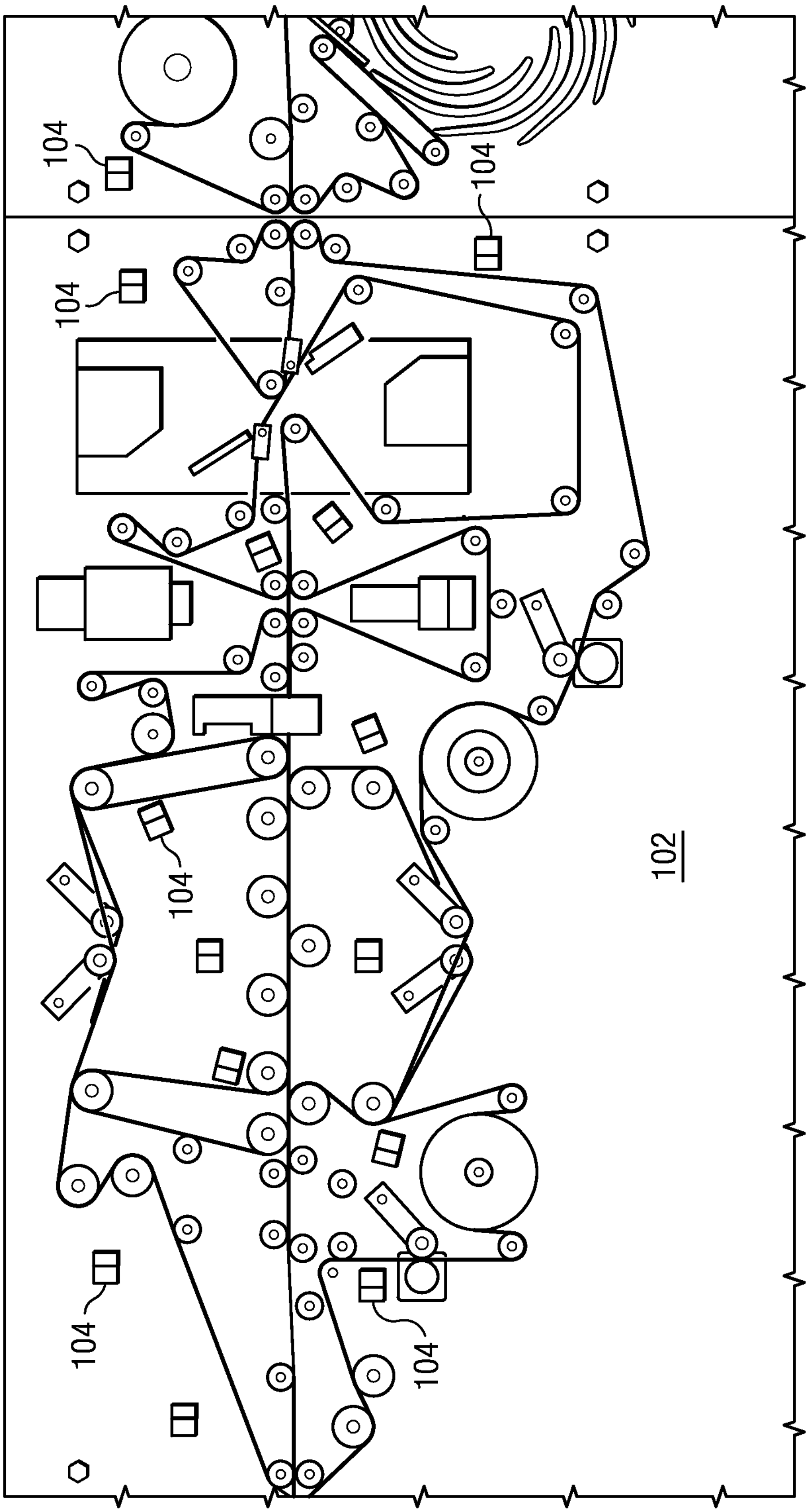

This application claims the benefit of provisional Application No. 61/096,230, filed Sep. 11, 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to high-volume currency processing systems, and more specifically, to automated diagnostic systems and procedures for monitoring and maintaining currency processing systems.

2. Description of Related Art Including Information Disclosed Under 37 CFR 1.97 and 1.98

Typical automated currency processing machines utilize a central processing unit that monitors certain system operational parameters such as temperature and various performance metrics (i.e., throughput, detection accuracy, etc.). When a fault occurs, the processor may reconstruct what it knows of the operating conditions at the time of the failure in an attempt to assist in the diagnosis of the failure. Often all that is generated through such reconstruction is a cryptic failure code, at best. Still, most machines feature no diagnostic capabilities whatsoever and instead rely on costly, experienced service technicians to perform repairs based upon their diagnostic capabilities.

High-speed currency processing machines are costly to purchase and expensive to maintain. Current diagnostic capabilities for such machines are reactive at best. Accordingly, a need exists for a new diagnostic system that is proactive such that it actively monitors the current operating performance of a bank note processor and automatically predicts or detects when a fault may occur or is occurring, and even schedule maintenance when necessary. The present invention satisfies these needs and others as demonstrated by the following detailed description.

BRIEF SUMMARY OF THE INVENTION

A method for monitoring the health of a bank note processing machine, the machine comprising a plurality of operating condition sensors positioned within the machine at specific points of interest, the sensors in communication with a central processing unit (CPU) for automatic gathering and analysis of sensor data, the method steps comprising: obtaining baseline profile data of the machine operating condition from one or more of the sensors; monitoring the sensors during machine operation to obtain operating data; comparing the baseline data with the operating data to determine if an abnormal condition exists within the machine; and logging the comparison results.

A diagnostic system for use in a bank note processing machine, the system comprising: a plurality of operating condition sensors, wherein the sensors are positioned throughout the machine at points of interest; a central processing unit in communication with the plurality of sensors, wherein the processing unit is operably configured to execute stored program instruction steps, the program steps comprising: obtaining baseline profile data of the machine operating condition from one or more of the sensors; monitoring the sensors during machine operation to obtain operating data; comparing the baseline data with the operating data to determine if an abnormal condition exists within the machine; and logging the comparison results.

This summary is not intended to limit the scope of the invention to any particular described embodiment or feature. It is merely intended to briefly describe some of the key features to allow a reader to quickly ascertain the subject matter of this disclosure. The scope of the invention is defined solely by the claims when read in light of the detailed disclosure.

BRIEF DESCRIPTION OF THE SEVERAL VIEWS OF THE DRAWING(S)

Figure 2:
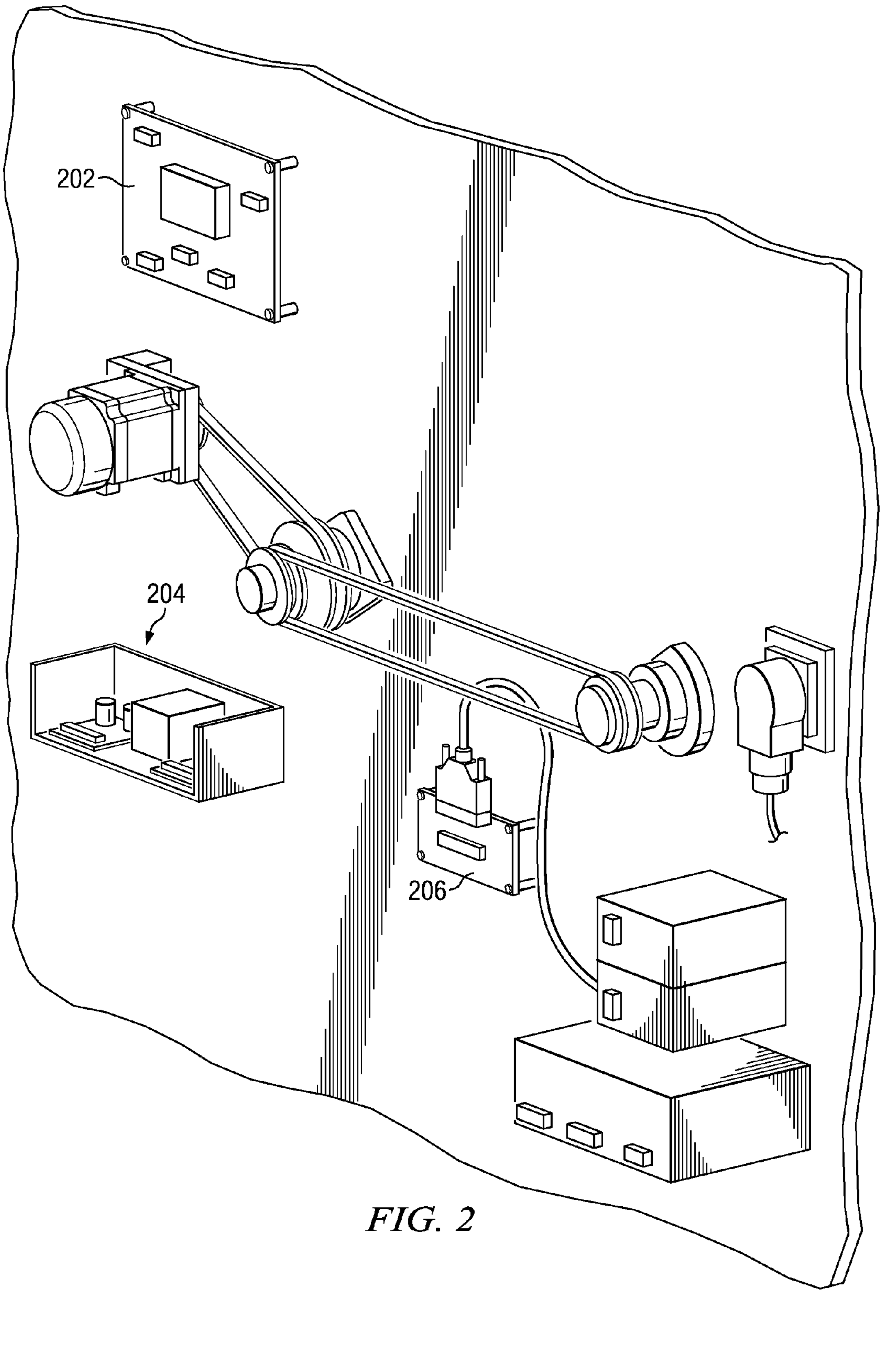

The present invention will be more fully understood by reference to the following detailed description of the preferred embodiments of the present invention when read in conjunction with the accompanying drawings, in which like reference numbers refer to like parts throughout the views, wherein:

FIG. 1 is a front view of the detection module of a bank note processing machine incorporating the diagnostic sensors of the present invention; and FIG. 2 is a rear view of the same scanner section.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

DETAILED DESCRIPTION OF THE INVENTION

Bank note currency processing machines typically require a feeder, a scanner, and one or more sorter pockets. However, users often require differing configurations or additional functionality, such as note destruction or note stacking/strapping. All of this mechanization with its multitude of moving parts creates enormous wear and tear on components. Further, continuous use of such machines is the norm, resulting in substantial wear and shortened component lifetimes. The present invention provides a set of self-diagnostic health sensors, capable of allowing the machine to be maintained at a higher performance level with reduced unplanned maintenance.

As used herein, the term "central processor" means a computer processing device that is capable of executing stored program instructions to perform the described functions. This computer processing device may include one or a combination of a personal computer, a mainframe, a workstation, a single board computer, a handheld computer, a notebook or laptop computer, or the like.

In a first embodiment, the invention utilizes temperature, acoustic, current, detector range, and detector correlation sensors to monitor the health of the entire bank note processing system. The operating conditions monitored include, but are not limited to, noise, vibration, temperature, current usage, and detector operating characteristics. FIG. 1 and FIG. 2 depict the detector section (102) of a bank note processing machine, highlighting the location of the various sensors. Every other section of the machine features similar arrangements of the same types of detectors. Each of the detectors is monitored by a central processing unit (206) that repeatedly samples the detector outputs and logs the results in a database for later comparison.

Acoustics

In the present embodiment, acoustic sensors (104) are placed at strategic locations throughout the bank note transport path. The position of the acoustic sensors (104) is chosen such that they are sufficiently close to areas of interest such as areas having numerous pulleys, gears, or belt folds. As the system operates, the central processor monitors the acoustic sensors and logs the resulting data into a database. This allows the processor to essentially "hear" the current operating condition of the machine. By doing so, it is easier to detect when a bearing or other device may need servicing, or when a belt is nearing the end of its useful life.

When the machine is new or in a known normal condition (i.e., not in need of repair or maintenance), the central processor takes a snapshot of the acoustic signature. This serves as the acoustics "base line" against which future acoustic snapshots may be compared. If a particular area of the transport path changes in noise signature during machine operation, it is likely that this area may have a developing problem. The central processor knows where each sensor is located and, as such, can alert a user or technician to the need for maintenance in that area.

Temperature

As with the acoustic sensors, the machine has temperature sensors placed in all areas in which temperature may be at issue. For example, each of the power conditioning units is susceptible to heat failure and must be monitored. Likewise, motors and encoders may have embedded RTDs or thermistors to allow for monitoring of operating temperature. The output of each temperature sensor is also regularly monitored and logged by the central processing unit.

When the machine is new or in a known normal condition (i.e., not in need of repair or maintenance), the central processor takes a snapshot of the temperature signatures. This serves as a temperature "base line" against which future temperature measurements are compared. If a particular device or area of the system is increasing in heat signature, it is likely that the part needs maintenance or is developing an operational problem and must be replaced. The central processor knows where each sensor is located and, as such, can alert a user or technician to the need for maintenance in that area. By repairing the problems before a failure actually occurs, it is easy to predict downtime and schedule accordingly for the most efficient utilization of the hardware.

Current Drain

Current sensors (202, 204) are utilized to monitor electrical current usage by powered components, such as electric motors, motor controllers, servos, and encoders. The central processor regularly monitors and logs the current sensors during operation.

When the machine is new or in a known normal condition (i.e., not in need of repair or maintenance), the central processor takes a snapshot of the current drain signature. This serves as a current drain "base line" against which future measurements may be compared. If a particular piece of electrical hardware requires more current during machine operation, it is likely that this area may have a developing problem or may be overloaded. The central processor knows where each sensor is located and, as such, can alert a user or technician to the need for maintenance in that area.

Detector Range

System detectors (i.e., the bank note detectors along the transport path) are regularly monitored and logged by the central processing unit for operation of the system. However, in addition to normal monitoring for note attributes such as defects, denomination, etc., the range of the detectors is also monitored. The central processor is aware of the capabilities of each detector that it monitors. With each sample that it receives from a sensor, the processor compares the sensor output to its know range to determine if it is operating properly. If the sensor reading is out of range, the system knows to alert the user or maintenance technician to the possibility of component failure. If the sensor appears to be drifting out of range, future failure may be predicted or maintenance may be ordered to bring the sensor back into specification.

Detector Correlation

The present embodiment also monitors and compares the outputs of like (redundant) detectors to track whether or not the like detectors correlate. If they correlate (and are within range specification) then it can be assumed that they are functioning properly. However, if a detector does not correlate with other like detectors when it obviously should, then the detector is likely failing or requires maintenance. The processor logs this condition and schedules repair or maintenance or notifies the operator accordingly.

Utilization Profile

The present embodiment also maintains the logged sensor data in a database to build a utilization profile specific to a given environment. Measurements from each of the sensors can be combined to create a very accurate picture of the system in any configuration. If the configuration is changed or modified in any way, a new base line may be established by indicating a desire for such to the central processor. Thus, if a new module (such as an additional sorter) is added the system profile is easily updated to include the new hardware.

Operator Feedback

The present embodiment also includes a real-time graphical display of system sub-modules to allow an operator to monitor the machines current state. This display may be accessed by logging into the system over the network with a dedicated user interface or Web browser. Once logged in the user has access to all historical diagnostic data and sensor trend data. This simplifies system compliance monitoring and reduces the need for highly-skilled and experienced field engineers. Further, such monitoring by the user may occur literally anywhere a network connection is available.

Reporting and Maintenance

The system controller utilizes a non-volatile storage memory to log all performance and diagnostic metrics. Such metrics may be gathered and displayed from either the primary system interface or remotely, such as from a remote network connection. Display of data is in common document formats or HTML for viewing using a typical Internet browser such as Internet Explorer or Firefox.

System maintenance may be requested or merely monitored via the network interface. By compiling the performance and diagnostic metrics, it is possible to maintain tight maintenance schedules. Maintenance standards established by a Central Bank may also be monitored for compliance, remotely, by the Central Bank.

The present embodiment allows the central processor to automatically halt operation if certain catastrophic or non-catastrophic failures occur or are likely to occur. Because the system monitors the events in real-time, there is typically adequate notice before such events occur. This affords the operator sufficient time to log into the machine and override any non-catastrophic failure induced impending shutdown, if necessary.

Claim 1 A method for monitoring the health of a bank note processing machine, the machine comprising a plurality of operating condition sensors positioned within the machine at specific points of interest, the sensors in communication with a central processing unit (CPU) for automatic gathering and analysis of sensor data, the method steps comprising: obtaining baseline profile data of the machine operating condition from one or more of the sensors; monitoring the sensors during machine operation to obtain operating data; comparing the baseline data with the operating data to determine if an abnormal condition exists within the machine; and logging the comparison results.

Claim 2 The method of Claim 1, the method steps further comprising: locating the approximate area within the machine of the abnormal condition; and notifying the operator of the abnormal condition and the location.

Claim 3 The method of Claim 1, wherein the operating condition sensors are acoustic sensors and wherein the acoustic sensors monitor the mechanical systems of the machine for noise or vibration.

Claim 4 The method of Claim 1, wherein the operating condition sensors are temperature sensors and wherein the temperature sensors monitor localized temperatures among the mechanical systems of the machine.

Claim 5 The method of Claim 1, wherein the operating condition sensors are electrical current sensors and wherein the electrical current sensors monitor current usage of specific electrical components within the machine.

Claim 6 The method of Claim 1, wherein the operating condition sensor is the CPU, the method steps further comprising: monitoring the output data of at least one bank note detector; comparing the output data with the known normal range of the bank note detector; and notifying the operator if the output data is outside the known range.

Claim 7 The method of Claim 1, wherein the operating condition sensor is the CPU, the method steps further comprising: monitoring the output data of a first bank note detector; monitoring the output data of at least a second bank note detector that is functionally similar to the first bank note detector; comparing the first and second detector output data; and notifying the operator if the first and second detector output data does not correlate.

Claim 8 The method of Claim 1, the method steps further comprising: automatically scheduling maintenance or repair based upon the comparison results.

Claim 9 The method of Claim 1, wherein the sensors are monitored in real-time during machine operation to obtain real-time operating data, the method steps further comprising: automatically halting the machine in response to the comparison results.

Claim 10 A diagnostic system for use in a bank note processing machine, the system comprising: a plurality of operating condition sensors, wherein the sensors are positioned throughout the machine at points of interest; a central processing unit in communication with the plurality of sensors, wherein the processing unit is operably configured to execute stored program instruction steps, the program steps comprising: obtaining baseline profile data of the machine operating condition from one or more of the sensors; monitoring the sensors during machine operation to obtain operating data; comparing the baseline data with the operating data to determine if an abnormal condition exists within the machine; and logging the comparison results.

Claim 11 The system of Claim 10, the program steps further comprising: locating the approximate area within the machine of the abnormal condition; and noting the operator of the abnormal condition and the location.

Claim 12 The system of Claim 10, wherein the operating condition sensors are acoustic sensors and wherein the acoustic sensors monitor the mechanical systems of the machine for noise or vibration.

Claim 13 The system of Claim 10, wherein the operating condition sensors are temperature sensors and wherein the temperature sensors monitor localized temperatures among the mechanical systems of the machine.

Claim 14 The system of Claim 10, wherein the operating condition sensors are electrical current sensors and wherein the electrical current sensors monitor current usage of specific electrical components within the machine.

Claim 15 The system of Claim 10, wherein the operating condition sensor is the CPU, the program steps further comprising: monitoring the output data of at least one bank note detector; comparing the output data with the known normal range of the bank note detector; and notifying the operator if the output data is outside the known range.

Claim 16 The system of Claim 10, wherein the operating condition sensor is the CPU, the program steps further comprising: monitoring the output data of a first bank note detector; monitoring the output data of at least a second bank note detector that is functionally similar to the first bank note detector; comparing the first and second detector output data; and notifying the operator if the first and second detector output data does not correlate.

Claim 17 The system of Claim 10, the program steps further comprising: automatically scheduling maintenance or repair based upon the comparison results.

Claim 18 The system of Claim 10, wherein the sensors are monitored in real-time during machine operation to obtain real-time operating data, the program steps further comprising: automatically halting the machine in response to the comparison results.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

I claim:

1. A method for monitoring the health of a bank note processing machine using a plurality of operating condition sensors positioned within the machine at specific points of interest, the sensors in communication with a central processing unit (CPU) connected to a memory for automatic gathering and analysis of sensor data, the method steps comprising:
obtaining baseline data of the bank note processing machine operating condition from one or more of the sensors by the CPU and storing the baseline profile data in the memory;
monitoring the sensors by the CPU during the bank note processing machine operation to obtain operating data and storing the operating data in the memory;
comparing by the CPU the baseline data with the operating data by reading the data from the memory to determine if an abnormal condition exists within the bank note processing machine; and
logging the comparison results in the memory.

2. The method of claim 1, the method steps further comprising:
locating the approximate area within the bank note processing machine of the abnormal condition; and
notifying the operator of the abnormal condition and the location.

3. The method of claim 1, wherein the operating condition sensors are acoustic sensors and wherein the acoustic sensors monitor the mechanical systems of the bank note processing machine for noise or vibration.

4. The method of claim 1, wherein the operating condition sensors are temperature sensors and wherein the temperature sensors monitor localized temperatures among the mechanical systems of the bank note processing machine.

5. The method of claim 1, wherein the operating condition sensors are electrical current sensors and wherein the electrical current sensors monitor current usage of specific electrical components within the bank note processing machine.

6. The method of claim 1, wherein the operating condition sensor is the CPU, the method steps further comprising:
monitoring the output data of at least one bank note detector;
comparing the output data with the known normal range of the bank note detector; and
notifying the operator if the output data is outside the known range.

7. The method of claim 1, wherein the operating condition sensor is the CPU, the method steps further comprising:
monitoring the output data of a first bank note detector;
monitoring the output data of at least a second bank note detector that is functionally similar to the first bank note detector;
comparing the first and second detector output data; and
notifying the operator if the first and second detector output data does not correlate.

8. The method of claim 1, the method steps further comprising:
automatically scheduling maintenance or repair based upon the comparison results.

9. The method of claim 1, wherein the sensors are monitored in real-time during bank note processing machine operation to obtain real-time operating data, the method steps further comprising:
automatically halting the machine in response to the comparison results.

10. A diagnostic system for use in a bank note processing machine, the system comprising:
a plurality of operating condition sensors, wherein the sensors are positioned throughout the bank note processing machine at points of interest;
a central processing unit in communication with the plurality of sensors, wherein the processing unit is operably configured to execute stored program instruction steps, the program steps comprising:
obtaining baseline profile data of the bank note processing machine operating condition from one or more of the sensors;
monitoring the sensors during bank note processing machine operation to obtain operating data;
comparing the baseline data with the operating data to determine if an abnormal condition exists within the bank note processing machine; and
logging the comparison results.

11. The system of claim 10, the program steps further comprising:
locating the approximate area within the bank note processing machine of the abnormal condition; and
notifying the operator of the abnormal condition and the location.

12. The system of claim 10, wherein the operating condition sensors are acoustic sensors and wherein the acoustic sensors monitor the mechanical systems of the bank note processing machine for noise or vibration.

13. The system of claim 10, wherein the operating condition sensors are temperature sensors and wherein the temperature sensors monitor localized temperatures among the mechanical systems of the bank note processing machine.

14. The system of claim 10, wherein the operating condition sensors are electrical current sensors and wherein the electrical current sensors monitor current usage of specific electrical components within thebank note processing machine.

15. The system of claim 10, wherein the operating condition sensor is the CPU, the program steps further comprising:
monitoring the output data of at least one bank note detector;
comparing the output data with the known normal range of the bank note detector; and
notifying the operator if the output data is outside the known range.

16. The system of claim 10, wherein the operating condition sensor is the CPU, the program steps further comprising:
monitoring the output data of a first bank note detector;
monitoring the output data of at least a second bank note detector that is functionally similar to the first bank note detector;
comparing the first and second detector output data; and
notifying the operator if the first and second detector output data does not correlate.

17. The system of claim 10, the program steps further comprising:
automatically scheduling maintenance or repair based upon the comparison results.

18. The system of claim 10, wherein the sensors are monitored in real-time during bank note processing machine operation to obtain real-time operating data, the program steps further comprising:
automatically halting the bank note processing machine in response to the comparison results.

* * * * *